US00RE40267E

(19) United States
(12) Reissued Patent
Mehmen

(10) Patent Number: US RE40,267 E
(45) Date of Reissued Patent: Apr. 29, 2008

(54) DRAWER LATCH

(75) Inventor: Robert J. Mehmen, Shell Rock, IA (US)

(73) Assignee: Waterloo Industries, Inc., Waterloo, IA (US)

(21) Appl. No.: 10/830,497

(22) Filed: Apr. 22, 2004

Related U.S. Patent Documents

Reissue of:
(64) Patent No.: 6,375,235
Issued: Apr. 23, 2002
Appl. No.: 09/579,404
Filed: May 25, 2000

(51) Int. Cl.
*E05C 19/10* (2006.01)

(52) U.S. Cl. ..... 292/128
(58) Field of Classification Search ..... 292/126, 292/128, DIG. 37; 312/223.2, 333, 332.1
See application file for complete search history.

(56) References Cited

U.S. PATENT DOCUMENTS 2,944,864 A * 7/1960 Krivulka ..... 312/332.1
3,120,412 A * 2/1964 Caldwell ..... 312/332.1
4,681,381 A * 7/1987 Sevey ..... 312/333
5,292,191 A * 3/1994 Slivon ..... 312/332.1
5,435,640 A * 7/1995 Holcomb ..... 312/221
5,630,630 A * 5/1997 Price et al. ..... 292/128
5,720,535 A * 2/1998 Mehman
5,775,140 A * 7/1998 Hallsten ..... 70/85
5,785,398 A * 7/1998 Park ..... 312/223.2
5,868,478 A * 2/1999 Yemini ..... 312/332.1
6,547,289 B1 * 4/2003 Greenheck et al. ..... 292/126

OTHER PUBLICATIONS

Waterloo Medication Cart Series—Dual Sided Medication Cart brochure dated May 25, 1999.*
HON catalog, 310 Series Deep Full Suspension Files, p. 147, published prior to May 25, 1999.*
Lista catalog, p. 10, dated prior to May 25, 1999.*
Snap–on catalog, depicting Roll Cab and Top Chest, pp. 26–27, date prior to May 25, 1999.*
Bott Model R1 catalog and mobile cabinet dated prior to May 25, 1999.*

* cited by examiner

*Primary Examiner*—Stephen Avila
(74) *Attorney, Agent, or Firm*—Calfee, Halter & Griswold LLP

(57) ABSTRACT

A lock mechanism for a sliding drawer of the type mounted on telescopic slides in a cabinet includes a pivotal handle bar on the top front edge of the cabinet drawer front wall. The handle includes catch mechanisms biased for engagement with a strike extending from the drawer slides mounted on the inside of the cabinet. Manual rotation of the handle moves the handle and thus the catch mechanisms out of engagement with the strike enabling the cabinet drawer to be opened.

15 Claims, 4 Drawing Sheets

DRAWER LATCH

Matter enclosed in heavy brackets [ ] appears in the original patent but forms no part of this reissue specification; matter printed in italics indicates the additions made by reissue.

BACKGROUND OF THE INVENTION

In a principal aspect, the present invention relates to a latch mechanism for retaining a drawer mounted on telescopic slides in a cabinet. Mechanics' cabinets and tool cabinets typically are fabricated from sheet metal and include a cabinet enclosure with drawers mounted on telescoping slides. A typical example of such a construction is depicted in U.S. Pat. No. 4,681,381 and U.S. Pat. No. 5,435,640 which are incorporated herewith by reference.

Typically, in order to provide security for the contents within the cabinet drawers, a locking system is provided. The locking system will normally include a key actuated mechanism which enables locking the drawers in a closed position. Actuation or release of the key operated mechanism is necessary in order to release or unlock the drawers.

In addition to permanently locking the drawers in a closed position, it is also appropriate and desirable to provide a means by which the drawers will remain or be retained in a closed position unless positively opened by the mechanic or user of the cabinet. This is a desirable feature in a cabinet construction in order to preclude accidental opening of drawers thereby resulting in an unbalanced condition that would cause the cabinet to turn over due to the weight of tools and other items in the drawers acting as a cantilever weight causing the cabinet to tip. Additionally, it is desirable to provide a positive mechanism to maintain the drawers in a closed position so that the drawers will not accidentally open when the cabinet is, for example, being transported from one position to another. Also, it is desirable to keep the drawers in a closed, but not necessarily locked, position so that the drawers will not protrude unexpectedly or undesirably thereby posing a danger.

Thus, there has developed a need to provide a mechanism that is inexpensive, yet reliable, and which enables unlocked drawers to remain in the closed position unless positively opened. Certain mechanisms of this nature are depicted in the prior art. For example, U.S. Pat. No. 5,435,640 depicts a catch mechanism which maintains or holds a drawer in a closed position in a cabinet enclosure. The catch relies upon the elastomeric characteristics of the catch. In the event the elastomer material fails, however, the catch then fails. Thus, there has developed a need for an improved latch or safety catch mechanism for drawers which are not maintained in the locked position.

SUMMARY OF THE INVENTION

Briefly, the present invention comprises a latch mechanism for a sliding drawer mounted in a cabinet supported by telescoping slides. The latch mechanism is attached to the front side of the sliding drawer and includes a handle which extends over the front edge of the front side of the drawer as well as a section depending from the front edge and extending into the interior of the cabinet. Catch members are attached to the ends of the handle on the inside of the drawer and a biasing mechanism, such as a coil spring, biases the handle member so that the catch members are biased upwardly into position for engagement with strikes located on the inside of the cabinet enclosure adjacent the top front edge of the cabinet drawer when the drawer is in the closed position. The handle also includes tabs which interlock and engage the handle with the front panel or front side of the cabinet drawer.

By positioning the catch members at the opposite ends of the handle and between the front sides of the drawer, lateral movement of the handle is precluded thereby maintaining the handle in a stable yet pivotal position on the front edge of the cabinet drawer. Strikes are included on a section of each of the telescoping slides attached to the interior side wall of the cabinet.

Thus, it is an object of the invention to provide an improved latch mechanism which maintains sliding drawers in a cabinet in a closed position.

A further object of the invention is to provide a latch mechanism which is rugged, comprised of a very few number of parts, and which must be positively actuated in order to effect opening of a drawer.

Yet another object of the invention is to provide a latch mechanism which may be incorporated in the front handle of a drawer and which will automatically hold the drawer in a closed position when the drawer is moved to that closed position.

These and other objects, advantages and features of the invention is set forth in the detailed description which follows.

BRIEF DESCRIPTION OF THE DRAWING

In the detailed description which follows reference will be made to the drawing comprised of the following figures.

DESCRIPTION OF THE PREFERRED EMBODIMENT

Figure 1:
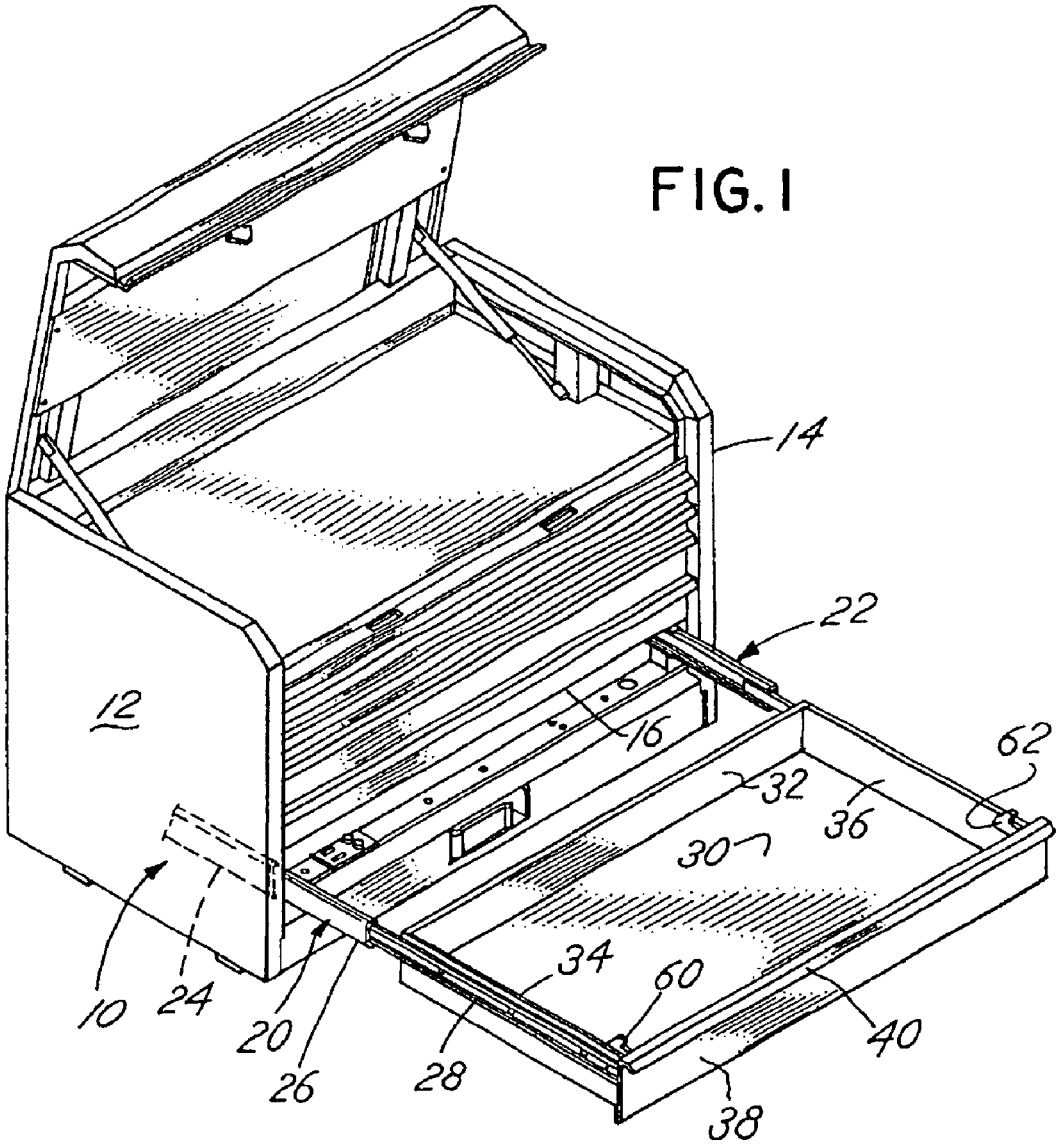
FIG. 1 is an isometric view of a typical cabinet having a construction which incorporates the latch mechanism of the present invention.

Referring to the drawings, a cabinet 10 includes a first lateral sidewall 12 and a second lateral sidewall 14 parallel to and spaced from wall 12. The walls 12 and 14 in combination with the other walls and braces forming the cabinet define an enclosure 16. A first telescopic slide 20 is attached to the inside of lateral wall or side 12. A second telescopic slide 22 is attached to the opposite lateral side or wall 14. The telescopic slides 20 and 22 include multiple sections such as sections 24, 26 and 28 of slide 20. The slides, such as slide 20, are affixed to the lateral sidewalls 12, 14 by interengagement of appropriate tabs, tangs and slots in a manner known to those of ordinary skill in the art. The telescopic sections 24, 26 and 28 slide with respect to one another again in a manner known to those of ordinary skill in the art. Section 24 is maintained fixed within the enclosure 16 defined by the cabinet 10. The slide 22 comprises a mirror image of the slide 20.

The slides 20 and 22 together support a single drawer 30 which includes a back wall or back side 32, a first lateral side wall 34, and a second, parallel spaced lateral side 36, as well as a front side wall 38. The drawer 30 is supported by the telescopic section, such as telescopic section 28, which is affixed to drawer side wall 34 by means of interengagement of tabs or projections with slots, again in the manner known to those of ordinary skill in the art. Positioning of the slides 20 and 22 is effected so that the drawer 30 will efficiently and effectively slide into and out of the cabinet 10. Slides 20, 22 extend along the top edge of the drawer 30.

The subject matter of the invention relates, in particular, to a front handle 40 which includes a latch mechanism for maintaining the drawer 30 in a closed position except when the handle 40 is appropriately actuated to release the drawer 30 from the closed position. The mechanism for effecting such retention is depicted in greater detail in FIGS. 2–5. Thus, the front side wall 38 of the drawer 30 includes a top edge 44 which, in the embodiment depicted, comprises a horizontal run 46 extending from a vertical front face or run 48 defining the front side wall 38. The horizontal run 46 extends outwardly from the interior of the drawer 30. The run 46 extends between the lateral side 34 and 36. A series of horizontal slots 50 are provided in face 48 adjacent the upper edge 44 in the front side wall 38.

The handle or handle member 40 includes a horizontal run 52 which typically fits against the run 46. Downwardly depending decorative and protective edge 54 connects with the run 52 on the outside of the drawer 30. Depending vertically downward from the run 52 is a downward run 56 which extends on the inside of the drawer 30 spaced inwardly from the front side wall 38. At strategic positions along the width of the downwardly depending front run 56 are a series of notched tabs 58 which are designed to fit through the horizontal openings 50 in face 48.

Catch members 60 and 62 are positioned at the opposite ends on the lateral sides of the run 56. The catch members 60, 62 comprise vertical plates attached to the downwardly depending run 56. Each catch member 60, 62 includes an upwardly extending tab or tang 64. The catch members 60 and 62 are positioned on the inside of the walls or lateral sides 34 and 36, respectively. Thus, the catch members 60 and 62 preclude lateral or side to side movement of the handle 40 when the assembly comprising the handle 40 is in position. Spring members, such as coil springs 66, are positioned intermediate the run 56 and the wall 38 to bias the handle 40 in the counterclockwise direction in FIG. 2 thereby positioning the catch members 60 and 62 in an extended counterclockwise position, or locking or closed position.

Figure 2:
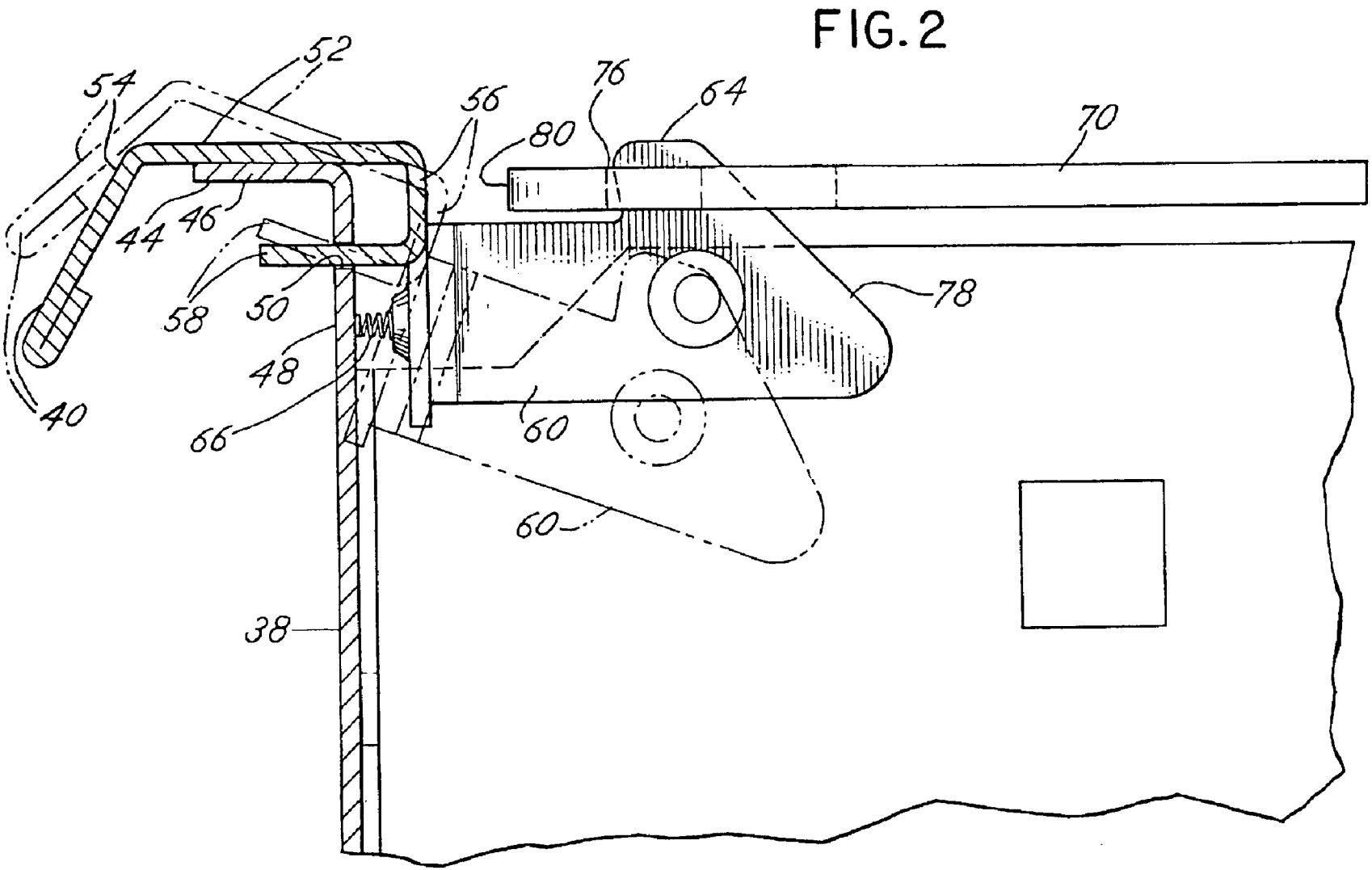
FIG. 2 is a side cross sectional view of the latch mechanism as incorporated in a drawer depicting the latch mechanism in the closed or locked, as well as the open, or released position.
Figure 3:
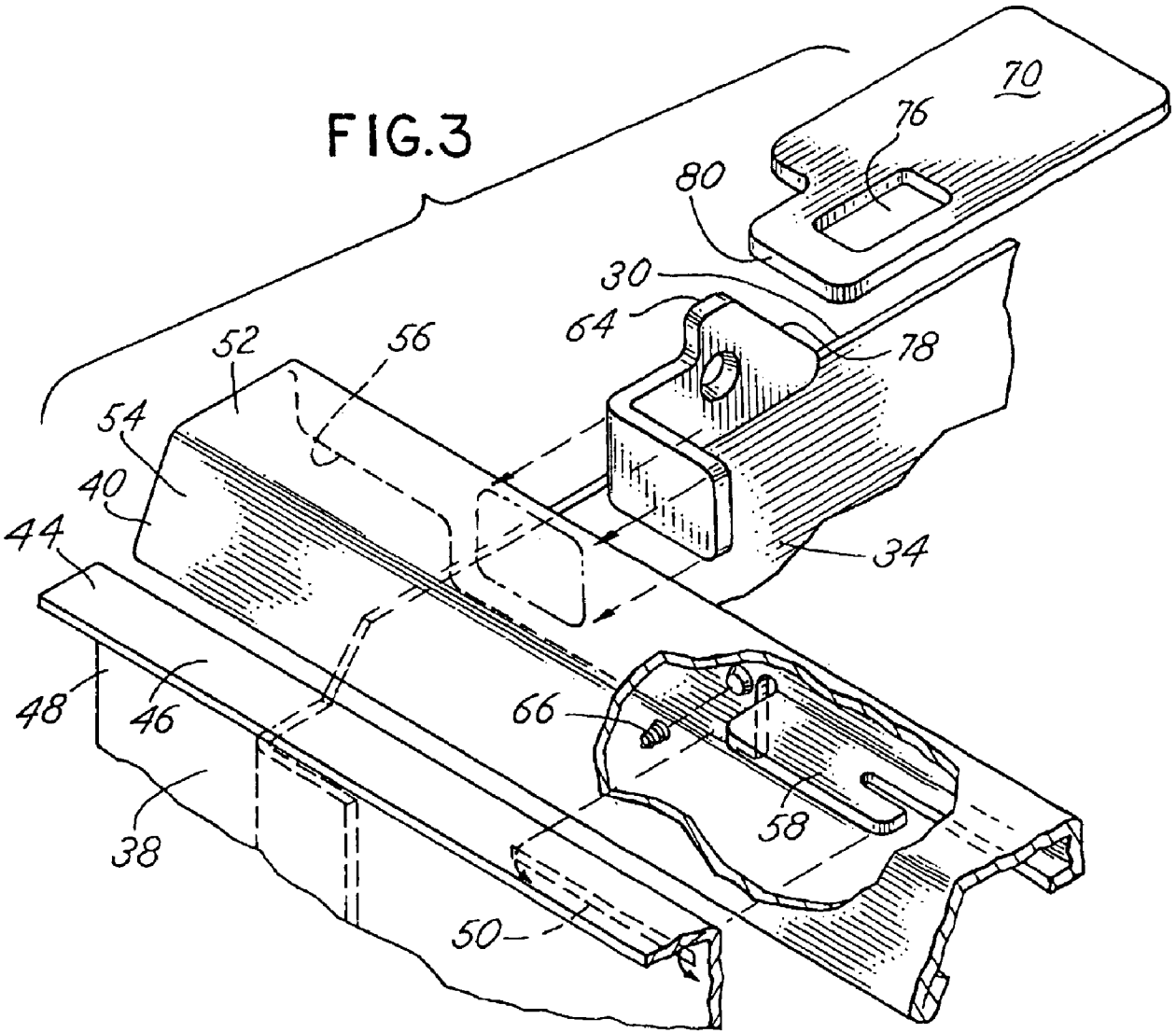
FIG. 3 is an exploded enlarged isometric view of the latch mechanism depicted as detail 3 in FIG. 1.
Figure 4:
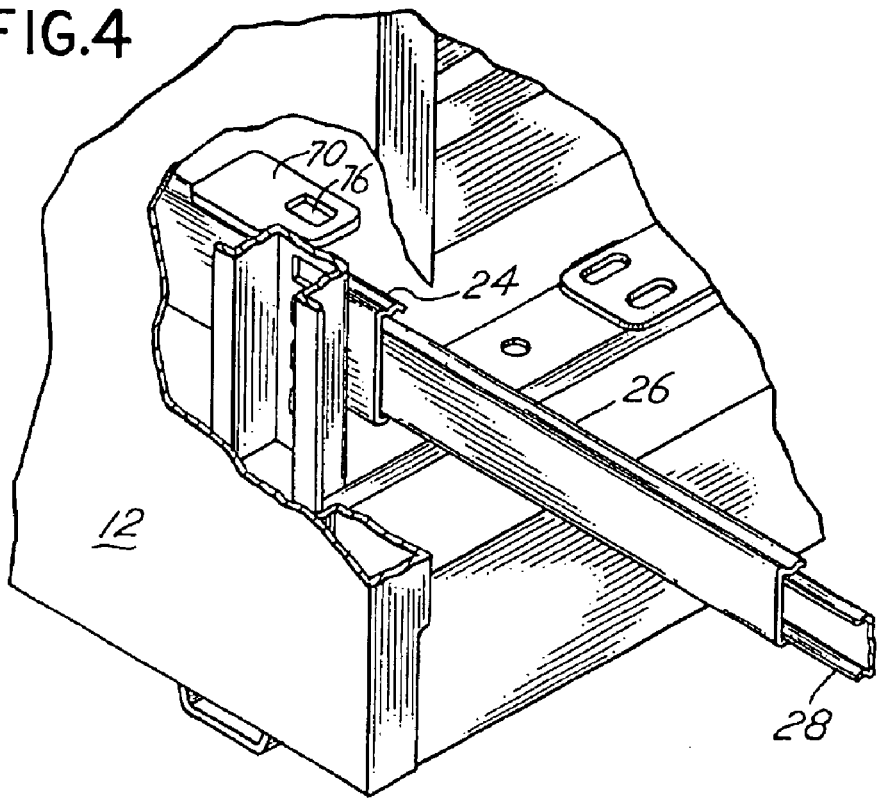
FIG. 4 is an enlarged isometric view of the strike portion of the latch mechanism of the invention as depicted at detail 4 in FIG. 1.
Figure 5:
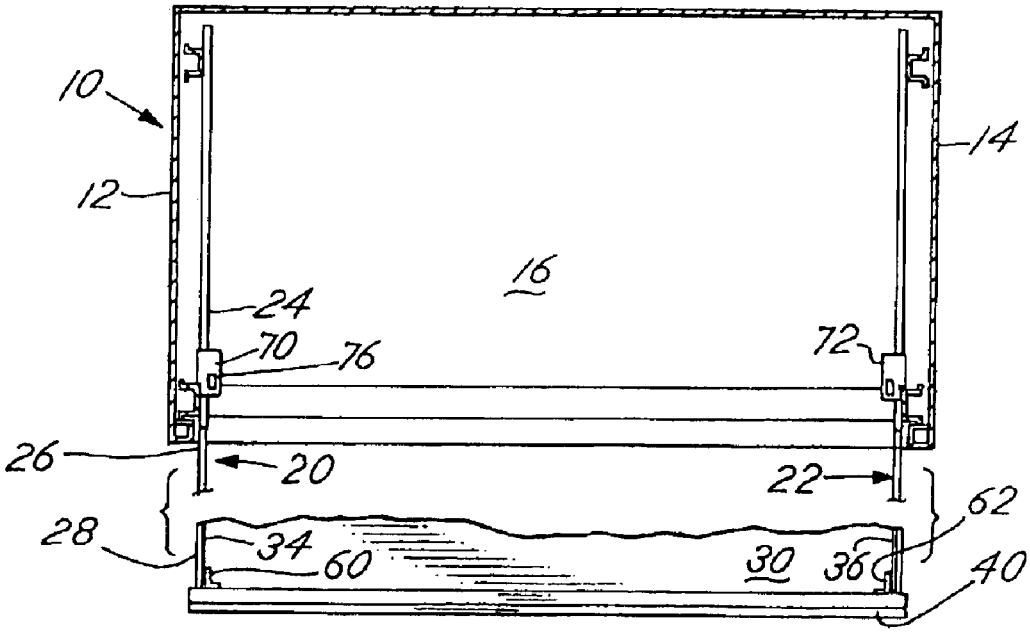
FIG. 5 is a cross sectional view of the assembly depicting the latch mechanism taken along the line 5—5 in FIG. 1.

Strikes or strike members 70, 72 are constructed for cooperation with the catch members 60 and 62 respectively and are attached as an integral part of the telescoping slides 20 and 22. Thus, the strike member 70 is a component part of the section 24 of the telescopic slide 20. The strikes 70, 72 comprise a horizontal plate with a strike passage 76 defined in the plate for receipt of a catch tab 64 as depicted in FIG. 2.

Thus, in operation, the drawer 30 is moved to the closed position by pushing the drawer 30 into the enclosure 16 of the cabinet 10. This causes the telescopic slide members 20 and 22 to telescope to the closed position. The locking tab 64 as associated with each catch 60, 62 will then ride into the opening 76. It is to be noted that there is a ramp or cam surface 78 on each of the catch members 60 and 62. The cam surface 78 engages against the front edge 80 of the strikes 70 and 72 forcing the handle 40 to pivot against the biasing force of the spring 66 about the top edge 46 of wall 38 until the catch 60, 62 is biased in the counterclockwise direction to fit into the opening 76. In the position depicted in FIG. 2, in solid lines, the drawer 30 is maintained in the closed and locked position. To release the drawer 30 one must manually engage the handle 40 and pivot the handle about the top edge 46 against the biasing force of the spring 66 to the position depicted in phantom in FIG. 2. This enables the drawer 30 to be released and the telescopic members 20 and 22 then permit the drawer 30 to be withdrawn from the enclosure 16.

The construction of the present invention has various advantages. Positive holding of the drawer in the closed position is effected. The drawer may be opened by easy manual operation. Because the handle 40 extends across the entire front face of the drawer, positioning and engaging the handle 40 is easily accomplished. Because of the manner in which the component parts are interengaged, the handle 40 remains locked or fixed in position pivotally on the top edge of the drawer 30, yet cannot be removed from the drawer 30. Additionally, because there are catch members 60, 62 on each side of the drawer 30, the drawer 30 cannot be easily skewed and there is positive locking.

The particular shape of the catch members 60, 62 may be altered in order to adjust the force of the engagement of the catch member 60, 62 and the strike 70, 72. Also, the part defining the strike 70, 72 and the part defining the catch member 60, 62 may have a reversed shape configuration. That is, the strike opening 76 may be positioned in place of the catch member 60 and vice versa. Thus, there may be a reversal of component parts in order to effect the locking operation. Various other modifications may be made without departing from the spirit and scope of the invention. The invention is, therefore, to be limited only by the following claims and equivalents thereof.

What is claimed is:

[1. A latch mechanism for a sliding drawer supported by telescoping slides and mounted in a cabinet with a cabinet wall and front opening, said drawer including a front side wall with a top edge and lateral side walls, said telescoping slides attached to the lateral side walls of the drawer for support and movement of the drawer into and out of the cabinet, said latch mechanism comprising in combination:

a drawer handle mounted on the front side wall of the drawer, said drawer handle including a plate positioned on the top edge of the drawer, said plate pivotal on the top edge between a first drawer retention position and a second drawer release position;

said plate projecting into the drawer from the front edge and including a catch member attached to the plate, said catch member including a catch tab projecting generally transverse to the direction of drawer slide movement;

means for biasing said plate and catch member about the front edge toward the first position; and a strike mounted on the inside of the cabinet at the front opening adjacent the drawer top edge when the drawer is closed, said strike positioned for engagement by the biased catch member when in the first position, and disengaged therefrom when the plate is manually pivoted about the top edge to the second position by moving the handle against the force of the means for biasing.]

[2. The mechanism of claim 1 wherein said strike is attached to the telescoping slide.]

[3. The mechanism of claim 1 including first and second catch members attached to the handle adjacent respectively the lateral side walls of the drawer, said first and second catch members positioned on the inside of the drawer to retain the handle from lateral sliding movement.]

[4. The mechanism of claim 1 wherein the handle includes a depending run extending from the plate on the inside of the drawer, said depending run hingedly connected to the front side wall of the drawer.]

[5. The latch mechanism of claim 1 wherein said slides comprise a first wall attachment section and at least one telescoping section, said telescoping section being attached to the lateral side wall of the drawer, said first wall attachment section including said strike.]

[6. The latch mechanism of claim 1 wherein the handle extends along the full front side wall of the drawer.]

[7. The latch mechanism of claim 1 including at least one interlocking tab for attaching the plate to the front side wall of the drawer.]

[8. A latch mechanism for a sliding drawer mounted in a cabinet with a cabinet wall and front opening, said drawer supported by telescoping slides attached to the cabinet wall and the drawer, said drawer including a front side wall with a top edge and lateral side walls, said telescoping slides attached to the lateral side walls of the drawer for support and movement of the drawer into and out of the cabinet, said slides comprising a first cabinet wall attachment section and at least one telescoping section attached to a lateral side wall of the drawer; said latch mechanism comprising in combination:

a drawer handle mounted on the front side wall of the drawer, said drawer handle including a plate on the top edge of the drawer, said plate pivotal on the top edge between a first drawer retention position and a second drawer release position;

said plate projecting into the drawer from the front edge and including a catch member attached to the plate with a catch tab projecting generally transverse to the direction of drawer slide movement;

means for biasing said plate and catch member about the front edge toward the first position; and a strike mounted on the inside of at least one of said cabinet wall slide attachment sections at the front opening adjacent the drawer top edge when the drawer is closed, said strike positioned for engagement by the biased catch member when in the first position, and disengagement therefrom when the plate is manually pivoted about the top edge to the second position by moving the handle against the force of the means for biasing.]

[9. The mechanism of claim 8 including first and second catch members attached to the handle, each catch member being adjacent to a separate one of the lateral side walls of the drawer to restrain the handle from side to side sliding movement as a result of engagement of the catch members with the lateral side walls.]

[10. The mechanism of claim 8 wherein the handle includes a depending run extending from the plate on the inside of the drawer, said depending run hingedly connected to the front side wall of the drawer.]

[11. The latch mechanism of claim 8 wherein the handle extends along the full front side wall of the drawer.]

[12. The latch mechanism of claim 8 including at least one interlocking tab for attaching the plate to the front side wall of the drawer.]

[13. A latch mechanism for a sliding drawer mounted in a cabinet with a cabinet wall and front opening, said drawer supported by telescoping slides attached to the cabinet and the drawer, said drawer including a front side wall with a top edge and lateral side walls, said telescoping slides attached to the lateral side walls of the drawer for support and movement of the drawer into and out of the cabinet, said latch mechanism comprising, in combination;

a drawer handle mounted on the front side wall of the drawer, said drawer handle including a plate pivotal on the top edge of the drawer between a first drawer retention position and a second drawer release position;

said plate projecting into the drawer from the front edge and including a first catch member and a second catch member, the first catch member attached to the handle adjacent one side wall of the drawer, the second catch member attached to the handle adjacent the other side wall of the drawer, said catch members positioned to retain the handle from lateral, side to side sliding movement, at least one of said catch members including a catch tab projecting generally transverse to the direction of drawer slide movement;

means for biasing the plate and catch members about the front edge toward the first position; and a strike mounted on the inside of said cabinet at the front opening adjacent the drawer top edge when the drawer is closed, said strike positioned for engagement by the biased catch member when in the first position, and disengagement therefrom when the plate is manually pivoted about the top edge to the second position by moving the handle against the force of the means for biasing.]

[14. The mechanism of claim 13 wherein the handle includes a depending run extending from the plate on the inside of the drawer, said depending run hingedly connected to the front side wall of the drawer.]

[15. The latch mechanism of claim 13 wherein said slides comprise a first wall attachment section at least one telescoping section attached to the lateral side wall of the drawer, said wall attachment section including said strike.]

[16. The latch mechanism of claim 13 wherein the handle extends along the full front side wall of the drawer.]

[17. The latch mechanism of claim 13 including at least one interlocking tab for attaching the plate to the front side wall of the drawer.]

*18. A latch mechanism for a sliding drawer supported by telescoping slides and mounted in a cabinet with a cabinet wall and front opening, said drawer including a front side wall with a top edge, the drawer also including lateral side walls, said telescoping slides attached to the lateral side walls of the drawer for support and movement of the drawer into and out of the cabinet, said latch mechanism comprising in combination:*

*a drawer handle mounted on the front side wall of the drawer, said drawer handle including a plate positioned on the top edge of the drawer, said plate pivotal about the top edge between a drawer retention position and a drawer release position;*

*said plate projecting into the drawer from said front side wall and including a catch member attached to the plate;*

*a member constructed for cooperation with said catch member connected to one of said lateral side walls and being positioned on the inside of the cabinet at the front opening adjacent the drawer top edge when the drawer is closed, said member constructed for cooperation with said catch member positioned for engagement by the catch member when said plate is in the retention position, and disengaged therefrom when the plate is in the drawer release position.*

*19. The mechanism of claim 18 wherein said member constructed for cooperation with said catch member is attached to the telescoping slide.*

*20. The mechanism of claim 18 including first and second catch members attached to the handle adjacent respectively the lateral side walls of the drawer, said first and second catch members positioned on the inside of the drawer to retain the handle from lateral sliding movement.*

*21. The mechanism of claim 18 wherein the handle includes a depending run extending from the plate on the inside of the drawer, said depending run hingedly connected to the front side wall of the drawer.*

*22. The latch mechanism of claim 18 wherein the handle extends along the full front side wall of the drawer.*

*23. The latch mechanism of claim 18 wherein the plate engages the top edge when the plate is in the retention position and the plate is spaced apart from the top edge when the plate is in the drawer release position.*

*24. A latch mechanism for a sliding drawer supported by telescoping slides and mounted in a cabinet with a cabinet wall and front opening, the drawer including a front side wall that includes a face and a run that extends from the face, the drawer further including lateral side walls, the telescoping slides attached to the lateral side walls of the drawer for support and movement of the drawer into and out of the cabinet, said latch mechanism comprising in combination:*

*a drawer handle including a plate disposed on the run that extends from the face of the drawer, said drawer handle plate being pivotal about the run that extends from the face between a drawer retention position and a drawer release position;*

*a catch member attached to said drawer handle;*

*a member constructed for cooperation with said catch member connected to the cabinet, said member constructed for cooperation with said catch member positioned for engagement by said catch member when said handle is in the retention position, and disengaged therefrom when said handle is in the drawer release position.*

*25. The latch mechanism of claim 24 wherein said member constructed for cooperation with said catch member is connected to one of the lateral side walls.*

*26. The latch mechanism of claim 25 wherein said member constructed for cooperation with said catch member is positioned on the inside of the cabinet at the front opening adjacent the drawer top edge when the drawer is closed.*

*27. The mechanism of claim 24 wherein said member constructed for cooperation with said catch member is attached to the telescoping slide.*

*28. The mechanism of claim 24 including first and second catch members attached to the handle adjacent respectively the lateral side walls of the drawer, said first and second catch members positioned on the inside of the drawer to retain the handle from lateral sliding movement.*

*29. The latch mechanism of claim 24 wherein the handle extends along the full front side wall of the drawer.*

*30. The latch mechanism of claim 24 wherein the handle engages the run that extends from the face when the handle is in the retention position and the handle is spaced apart from the run when the handle is in the release position.*

*31. The latch mechanism of claim 24 wherein the run extends horizontally from the face.*

*32. The latch mechanism of claim 24 wherein the run extends outward from an interior of the drawer.*

* * * * *